Nov. 28, 1933.   R. M. MARKUS   1,937,283
COOKING APPLIANCE
Filed May 1, 1930   4 Sheets-Sheet 1

Witness
William P. Kilroy

Inventor
Ralph M. Markus

Nov. 28, 1933.    R. M. MARKUS    1,937,283
COOKING APPLIANCE
Filed May 1, 1930    4 Sheets-Sheet 2
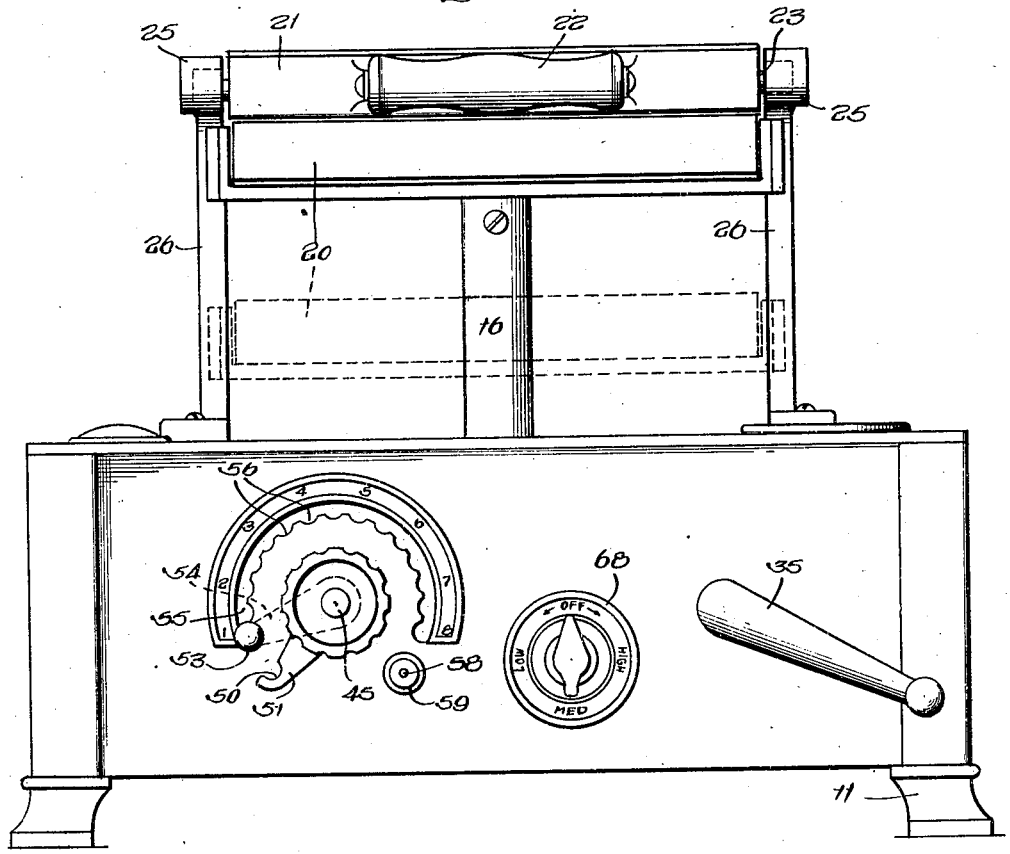
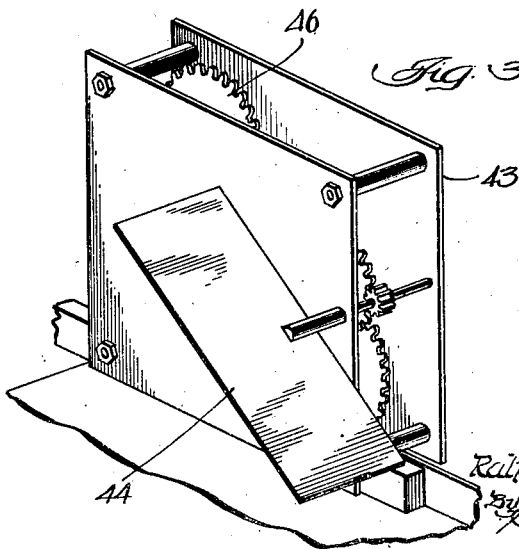

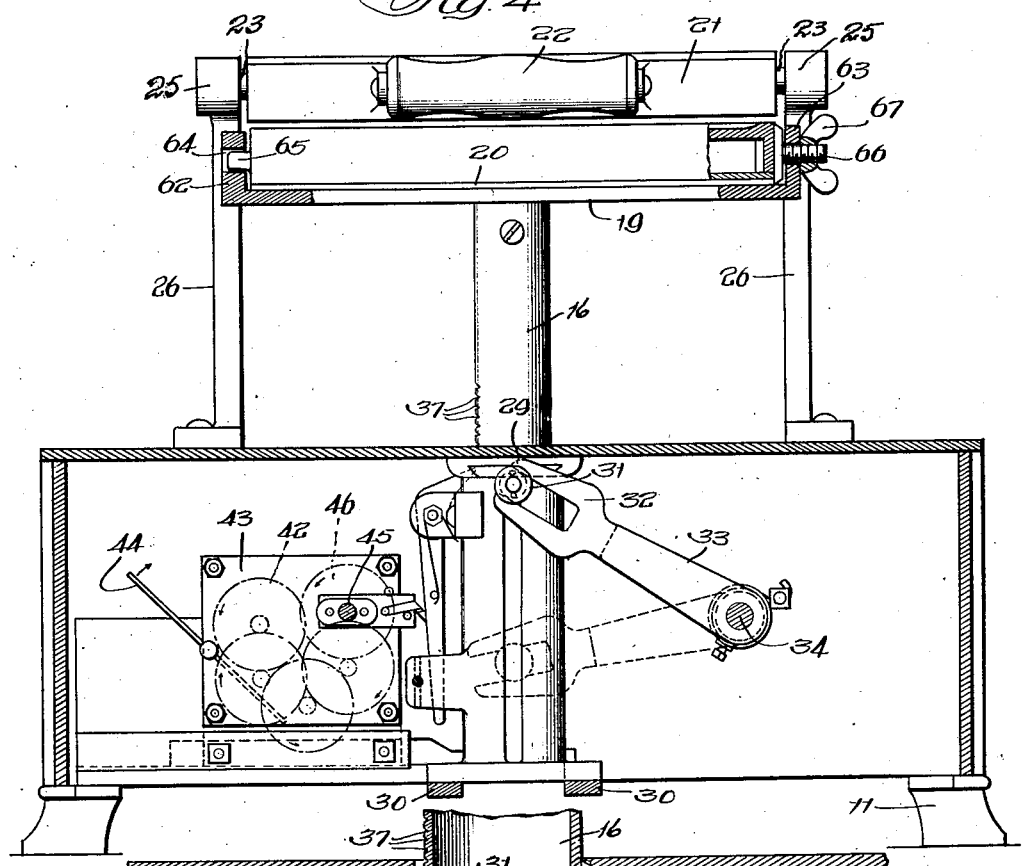

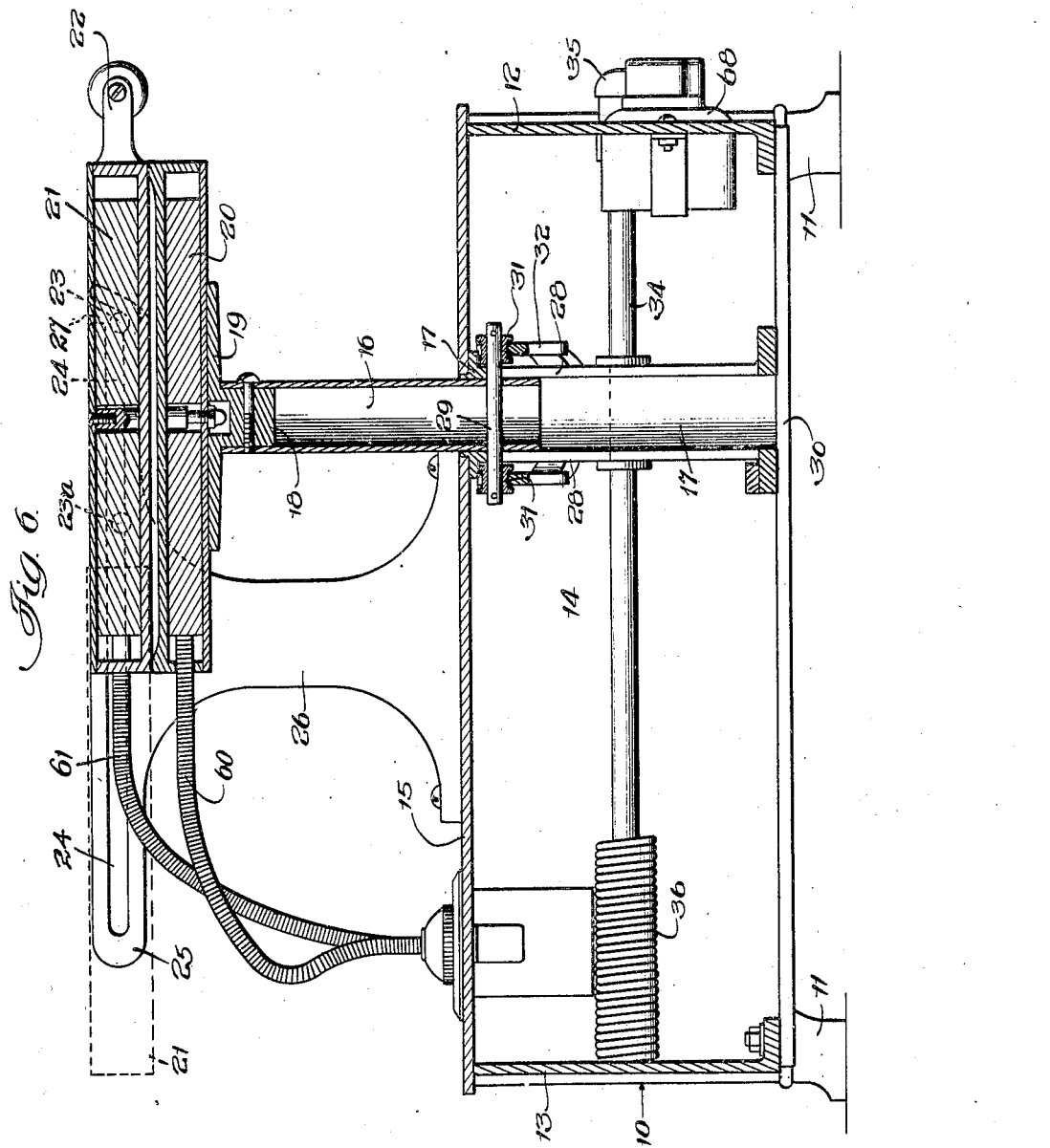

Patented Nov. 28, 1933

1,937,283

UNITED STATES PATENT OFFICE 1,937,283

COOKING APPLIANCE

Ralph M. Markus, Chicago, Ill., assignor, by mesne assignments, to Ernest Reich, Chicago, Ill.

Application May 1, 1930. Serial No. 449,055

4 Claims. (Cl. 53—5)

This invention relates to improvements in cooking appliances.

The cooking appliance of this invention is intended primarily for the toasting of bread or the like for immediate service in quick lunch counters, roadside houses, restaurants, lunch carts or the like, and the object of the invention is to provide a self-contained mechanism including a pair of hot plates which are relatively adjustable toward and from one another, between which the slices of bread or the like are placed for toasting or otherwise cooking the same.

The invention also includes means for automatically regulating the cooking period by causing the hot plates to separate from one another after the lapse of a predetermined interval, so that by setting the apparatus to the intended time period the toasting or cooking will proceed automatically for the desired interval.

A further object of the invention is to so mount one of the hot plates that it will be removable and reversible in position, thereby affording upon opposite sides of a single plate two cooking surfaces which may be differently surfaced or configured as desired to provide for the toasting or cooking of different articles of food.

The construction is also one which permits the plate to be slidably adjustable from its normal or cooking position in register with its companion plate, to a retracted position in which the companion plate is exposed, which arrangement enables access to be readily had to the bread or other articles of food being cooked; and the arrangement is also one which readily enables one cooking plate to be bodily removed and another substituted therefor as occasion may require.

The invention is so constructed as to present a pleasing and attractive appearance, and to enable the appliance to be easily and conveniently operated to adapt it to the requirements of quick service under the conditions stated.

Further objects and details of the invention will appear from a description thereof, in conjunction with the accompanying drawings, wherein,—

Fig. 2 is a front elevation thereof;

Fig. 3 is a perspective view showing the clockwork timing device;

Fig. 4 is a cross sectional elevation, taken on line 4—4 of Fig. 1;

Fig. 5 is an enlarged sectional detail showing the timing device and associated latch mechanism; and Fig. 6 is a sectional elevation, taken on line 6—6 of Fig. 1.

Figure 1:
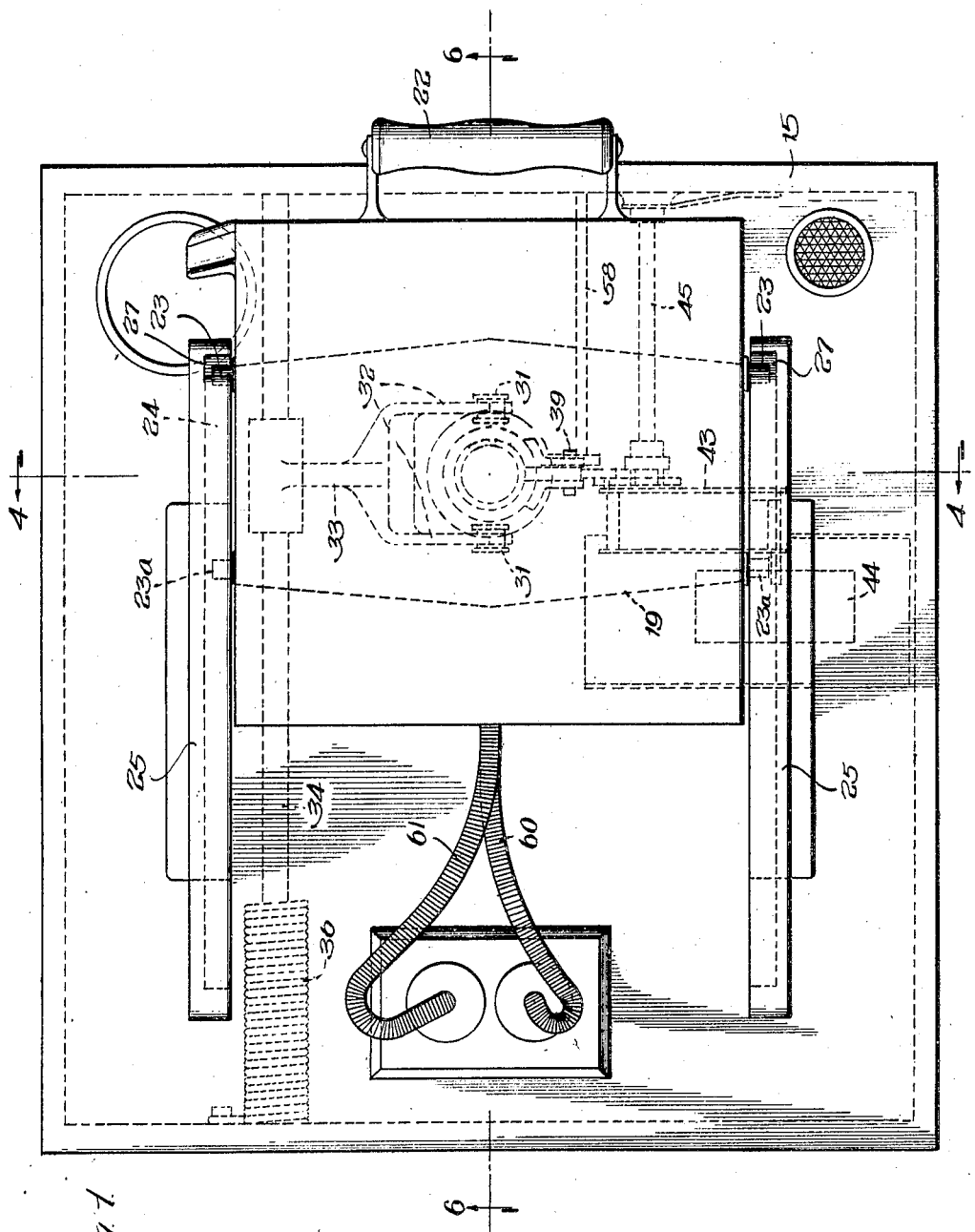
Figure 1 is a plan view of the appliance of the present invention.

The cooking appliance as a whole is mounted upon a boxlike base 10 provided with legs 11 at the four corners. The base comprises front and rear end walls 12 and 13 respectively, side walls 14, and a top wall 15, the bottom being open to afford easy access to the interior.

Toward the front of the base is located a sliding post or standard 16, which is slidably mounted within a column 17, the upper end of which is entered through the top 15.

The post is of tubular formation, and at its upper end receives a stud 18 depending from a supporting plate 19 which carries the lower cooking plate 20, which plate is of hollow formation and is provided in the interior with suitable electric heating elements of any desired character, which it is not deemed necessary to describe or illustrate.

The lower cooking plate 20 co-operates with an upper cooking plate 21, which is also hollow and is likewise provided on the interior with heating elements of suitable description. The upper cooking plate 21 is provided on its front edge with a handle 22 for purposes of manipulation or removal, and the two cooking plates are both of rectangular shape and of substantially the same dimensions, so that when in superposed relation, as in Fig. 6, will register with one another.

The upper cooking plate 21 is provided on opposite edges with forward and rear pairs of trunnions 23 and 23ª which are located one pair in front of and the other pair to the rear of the transverse center line through the upper cooking plate, and the trunnions fit into grooved trackways 24—24 formed along the inner faces of a pair of parallel spaced guide arms 25—25 which are located on opposite sides of the upper cooking plate, each being supported upon a standard 26, as best shown in Fig. 6.

Each of the grooved guideway terminates at its forward end in an upwardly opening throat 27, through which the trunnions may be released when the plate is drawn forward to bring the trunnions respectively into register with the open throats at the ends of the grooved trackways.

By reference to Fig. 1, it will be noted that the forward trunnions are in position to permit release by a lifting of the forward edge of the plate, after which a further lifting and swinging action will bring the rear trunnions 23ª—23ª into releasing position, so that the plate may be bodily removed and readjusted other side up, or another plate may be substituted therefor.

The guideways are of sufficient length to permit the upper plate to be shoved rearwardly to the limit of movement indicated in Fig. 6, which exposes the lower cooking plate and permits inspection of the bread or other articles of food being toasted or cooked, and also permits removal or replacement of articles of food, irrespective of the vertical adjustment of the lower plate. This arrangement greatly promotes convenience in manipulating the device as occasion may require.

In order to provide for the raising and automatic lowering of the lower cooking plate after a predetermined interval of time, the following mechanism is provided:

The tubular post 16, being mounted within the column 17, is guided in its vertical movements toward and from the upper cooking plate, and the column 17 is provided in its front and rear walls with slots 28 which afford freedom of movement for a cross pin 29 entered through the lower end of the post 16. The column at its lower end is mounted upon cross bars 30 (see Fig. 4).

The ends of the pin 29 carry rollers 31 which are engaged by the bifurcated ends 32 of a pair of arms 33 mounted upon a rock shaft 34, which at its forward end carries a handle 35 and at its rear end is encircled by a coil spring 36 which serves to cushion the descent of the lower cooking plate when released, and also to some extent counter-balances the weight of the lower cooking plate and permits it to be easily lifted by the movement of the handle.

The post 16 is provided on its exterior with a series of ratchet teeth 37 which are engaged by the tooth of a dog 38 pivoted upon a pin 39 carried between ears 40 standing outwardly from the column 17. The tooth of the dog extends obliquely upward and engages the ratchet teeth at a proper angle to permit the post to ride past the dog on the upward or lifting movement, and to insure the engagement of the teeth with the dog to prevent downward movement.

The lower or tail end of the dog is considerably elongated, as shown in Fig. 5, and is provided at an intermediate position with an outwardly extending tooth-shaped lug 41 having an abrupt upper face and a sloping under face.

When the dog stands in the normal position indicated in full lines in Fig. 5, it will hold the post which supports the lower cooking plate in elevated position, but when the tail of the dog is swung toward the column 17, as indicated in dotted lines, the tooth of the dog will release the ratchet teeth to permit the post to descend. Two methods are shown for securing such release, one being by means of an automatic timing device and the other by manual releasing mechanism which may be operated at any time irrespective of the timing mechanism.

The timing mechanism comprises clockwork, which includes a train of gears 42 carried between side plates 43 and operating a butterfly wheel 44 to effect a proper timing of the gears.

A winding arbor 45 serves to wind a main spring 46 which will be wound to the desired degree, depending upon the period of time during which it is intended for the timing mechanism to operate.

The winding arbor 45 carries a plate 47 (see Fig. 5), which in turn pivots a pawl 48 which is backed by a flat spring 49, the pawl resting upon an underlying stop 50.

The front end 51 of the pawl is beveled in complementary relation to the beveling of the lug 41, so that when the plate 47 is moved by the turning of the winding arbor 45 to the position indicated in dotted lines in Fig. 5, the pawl 48 will slip past the lug 41, but upon the return movement in a counter-clockwise direction the beveled end face of the pawl will engage the beveled face of the lug and swing the tail of the dog 38 inwardly to release the upper end of the dog from engagement with the ratchet teeth 37. It is obvious that the period prior to release will depend upon the arc of movement through which the plate 47 must swing before the pawl engages the lug 41 on the dog, and the length of this arc will be determined by the degree to which the clockwork is wound in the setting of the mechanism. Means are thus provided for releasing the lower cooking plate after a predetermined period, depending upon the setting of the timing device.

In order to regulate the timing, the following means are provided:

The winding arbor 45 extends forwardly through the front wall of the base or housing and carries an adjusting wheel 50, which also mounts an arm 51 provided with a recess 52 adapted to engage with an adjustable stop 53 carried at the other end of a spring arm 54.

The stop 53 extends outwardly through an arcuate slot 55 provided along its inner edge with spaced notches or serrations 56.

The arm 54 is in the form of a flat spring which is freely mounted upon the winding arbor 45, so that by depressing the stop 53 inwardly it will release from the notches or serrations and permit the stop to be adjusted to any desired position, and after adjustment, by release of the stop, the spring arm 54 will cause the stop to engage with the intended notch or serration. The stop may be thus adjusted to various positions, which as shown are indicated by numerals 1, 2, 3, and so forth, indicating units of time.

When the stop is adjusted in the first position, and when the arbor 45 is wound up to the first degree of tension to bring the arm 51 into contact with the stop 53, sufficient tension only will be imparted to the clockwork spring to enable the timing mechanism to operate through a single unit of time before the pawl is brought into releasing engagement with the dog 38.

Similarly, by adjusting the stop 53 to the second, third or fourth position, as may be selected, an additional and predetermined degree of tension will be imparted to cause the clockwork timing mechanism to perate for the intended period of time.

Where it is desired to release the dog 38 by manual operation, and irrespective of the action of the timing device, such release is effected by turning of an arm 57 carried by a rod 58, which may be manually rotated by a button 59 to cause the arm 57 to engage and swing the tail of the dog 38, as indicated in dotted lines in Fig. 5. This enables the lower coking plate to be released at any time, either during the operation of the timing device or independently thereof, as occasion may require.

As shown, the upper and lower cooking plates are heated by current supplied through flexible conductors 60 and 61 which are plugged into the respective upper and lower cooking plates, and, being flexible, adjust themselves to the movements imparted to the cooking plates.

In order to permit the lower vertically movable cooking plate to be released from the supporting plate 19, the latter is provided in each side with ears 62, one of which has formed therein an open slot 63 and the other of which has formed therein an aperture 64, which aperture receives a trunnion 65, and the slot 63 receives a threaded trunnion 66 carrying a wing nut 67, which when unscrewed permits the lower cooking plate 20 to be lifted from its support and reversed or removed as occasion may require.

The strength of the current supplied to the cooking plates for heating purposes may be regulated by the operation of a rheostat 68, which need not be described.

In use, with the upper and lower cooking plates adjusted in overlying relation, the lower cooking plate will occupy its released or depressed position at a considerable distance below the fixed level of the upper cooking plate so that abundant space will be afforded for introducing a slice of bread or other article of food in position, after which the lower cooking plate will be elevated by the action of the handle, the rack teeth slipping past the dog on the upward movement of the post which supports the lower plate. This enables the lower plate to be elevated to the degree required to bring the two plates into coacting relation with one another, to hold the food under pressure during cooking.

With the plates thus adjusted, the timing mechanism can be set by adjusting the spring mounted stop 53 to the desired position, and by turning the winding arbor until the arm 51 engages the stop thus adjusted, after which, upon release of the winding arbor, the clockwork will begin to unwind and the winding arbor to turn, which causes the plate 47 to swing upwardly to the degree required to bring the pawl 48 into releasing engagement with the lug 41 which swings the dog to release the ratchet teeth in the post which supports the lower cooking plate. Upon release, the weight of the lower cooking plate causes it to descend, after which the toasted bread or other article of food can be removed.

If it becomes desirable to inspect the article of food during the cooking operation, this can be done either by sliding back the upper plate or by manually releasing the lower plate. At the same time, the sliding adjustment of the upper plate permits easy access to be obtained to the lower plate for the purpose of cleaning, removal or adjustment, and thereby greatly facilitates the convenient employment of the apparatus under varying conditions. At the same time, both the upper and lower plates can be double faced so that either side may be employed for cooking purposes, and the surface arrangement and configuration of the plates on opposite sides can be differentiated, so that various combinations of cooking surfaces can be provided or additional plates of special formation can be substituted, thus enabling the apparatus to be readily converted to meet the requirements of various cooking or toasting operations.

The arrangement is one which holds the slices of bread, meat, bacon, or the like, under pressure between the two plates, and consequently into close contact with the heated surfaces, so that the time required for cooking is reduced to a minimum commensurate with the temperatures employed, and at the same time the articles of food are held against curling or distortion and are protected against contamination by any object falling from above on the food.

If desired, the upper plate can be moved back out of commission or elevated to vertical position, and the lower plate only used for cooking purposes, or in cases where it is desired to hold the food between the two plates, one only of the plates can be electrically connected, so that the cooking will take place on one side only.

Although the invention has been described with considerable detail, it is not the intention to limit the invention to the structure shown, since modifications thereof may be introduced without departing from the spirit of the invention.

I claim:

1. In a cooking appliance, the combination of a boxlike base, a vertically slidable standard upwardly projecting from the base, means within the housing for raising and lowering the standard, a horizontally disposed lower cooking plate mounted upon the upper end of the standard and movable therewith, bracket standard members mounted upon the housing on opposite sides of the vertically movable lower cooking plate, horizontal guide arms carried by the bracket standards and each provided with an elongated slot, and an upper cooking plate located between the slotted guide arms and provided on each side with a trunnion outwardly extending into the proximate slot to permit the upper cooking plate to be moved horizontally with respect to the lower cooking plate to expose the surface thereof.

2. In a cooking appliance, the combination of a boxlike base, a vertically slidable standard upwardly projecting from the base, means within the housing for raising and lowering the standard, a horizontally disposed lower cooking plate mounted upon the upper end of the standard and movable therewith, bracket standard members mounted upon the housing on opposite sides of the vertically movable lower cooking plate, horizontal guide arms carried by the bracket standards and each provided with an elongated slot, and an upper cooking plate located between the slotted guide arms and provided on each side with a trunnion outwardly extending into the proximate slot to permit the upper cooking plate to be moved horizontally with respect to the lower cooking plate to expose the surface thereof, the slots at one end being open to permit release of the trunnions and removal of the upper cooking plate.

3. In a cooking appliance, the combination of a boxlike base, a vertically slidable standard upwardly projecting from the base, means within the housing for raising and lowering the standard, a horizontally disposed lower cooking plate mounted upon the upper end of the standard and movable therewith, bracket standard members mounted upon the housing on opposite sides of the vertically movable lower cooking plate, horizontal guide arms carried by the bracket standards and each provided with an elongated slot, and an upper cooking plate located between the slotted guide arms and provided on each side with a pair of spaced trunnions outwardly projecting into the proximate guide slot to permit the upper cooking plate to be moved horizontally with respect to the lower cooking plate.

4. In a cooking appliance, the combination of a boxlike base, a vertically slidable standard upwardly projecting from the base, means within the housing for raising and lowering the standard, a horizontally disposed lower cooking plate mounted upon the upper end of the standard and movable therewith, bracket standard members mounted upon the housing on opposite sides of the vertically movable lower cooking plate, horizontal guide arms carried by the bracket standards and each provided with an elongated slot, and an upper cooking plate located between the slotted guide arms and provided on each side with a pair of spaced trunnions outwardly projecting into the proximate guide slot to permit the upper cooking plate to be moved horizontally with respect to the lower cooking plate, the ends of the guide slots being open to permit the trunnions to be released therefrom and permit the upper cooking plate to be removed.

RALPH M. MARKUS.